US012333461B2

(12) United States Patent
Selvam et al.

(10) Patent No.: US 12,333,461 B2
(45) Date of Patent: Jun. 17, 2025

(54) ITERATIVE ORDER AVAILABILITY FOR AN ONLINE FULFILLMENT SYSTEM

(71) Applicant: Maplebear Inc., San Francisco, CA (US)

(72) Inventors: Krishna Kumar Selvam, Cupertino, CA (US); Mouna Cheikhna, San Francisco, CA (US); Michael Chen, San Francisco, CA (US); Dylan Wang, Emeryville, CA (US); Joseph Cohen, New York, NY (US); Tahmid Shahriar, New York, NY (US); Graham Adeson, San Francisco, CA (US); Ajay Pankaj Sampat, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 227 days.

(21) Appl. No.: 17/955,395

(22) Filed: Sep. 28, 2022

(65) Prior Publication Data

US 2024/0104449 A1 Mar. 28, 2024

(51) Int. Cl.
*G06Q 10/0631* (2023.01)
*G06Q 10/0639* (2023.01)
*G06Q 30/0601* (2023.01)

(52) U.S. Cl.
CPC . *G06Q 10/06311* (2013.01); *G06Q 10/06398* (2013.01); *G06Q 30/0635* (2013.01)

(58) Field of Classification Search
None
See application file for complete search history.

(56) References Cited

U.S. PATENT DOCUMENTS

| | | | | |
|---|---|---|---|---|
| 5,734,837 A | * | 3/1998 | Flores | G06Q 10/10 705/7.26 |
| 7,389,249 B2 | * | 6/2008 | Hsu | G06Q 10/087 705/28 |
| 8,458,007 B2 | * | 6/2013 | Shafiee | G06Q 10/06316 705/7.26 |
| 10,803,413 B1 | * | 10/2020 | Xu | G06Q 10/067 |

(Continued)

FOREIGN PATENT DOCUMENTS

| | | | | |
|---|---|---|---|---|
| WO | WO-2018068026 A1 | * | 4/2018 | B25J 5/007 |
| WO | WO-2021099853 A1 | * | 5/2021 | B65G 1/1373 |

OTHER PUBLICATIONS

Steve "What is Order Fulfillment?", eFulfillment service, Jan. 2013, pp. 1-25 (Year: 2013).*

*Primary Examiner* — Romain Jeanty
(74) *Attorney, Agent, or Firm* — Fenwick & West LLP (57) ABSTRACT

An online concierge system iteratively makes a batch of one or more orders available to an increasing number of shoppers to choose to fulfill. Each shopper may choose to accept or reject a batch for fulfillment. To improve batch acceptance and matching between batches and shoppers, the batches are scored with respect to expected resource costs, likelihood of acceptance by the shopper, and/or other quality metrics to iteratively offer the batch to an increasing number of shoppers (prioritizing the scoring factors) until a shopper accepts. The number of shoppers notified of the batch and the frequency that additional shoppers are selected may vary based on characteristics of the batch and likelihood the batch will be accepted by a shopper.

20 Claims, 6 Drawing Sheets

(56) References Cited

U.S. PATENT DOCUMENTS

| | | | |
|---|---|---|---|
| 11,132,739 B1* | 9/2021 | Park | H04W 4/80 |
| 2014/0040075 A1* | 2/2014 | Perry | G06Q 30/0635 |
| | | | 705/26.81 |
| 2018/0300800 A1* | 10/2018 | Rajkhowa | G06Q 10/083 |
| 2020/0410864 A1* | 12/2020 | Ripert | G08G 1/20 |
| 2023/0113386 A1* | 4/2023 | Nejad | G06Q 30/0633 |
| | | | 705/26.8 |

* cited by examiner

ITERATIVE ORDER AVAILABILITY FOR AN ONLINE FULFILLMENT SYSTEM

BACKGROUND

Online concierge systems receive orders from users (also termed "customers") and coordinate order fulfillment with shoppers who retrieve the orders and coordinate delivery to the users. Orders may also be grouped into one or more batches that may be delivered together by one shopper. Shoppers may access the online concierge system or receive notifications from the online concierge system regarding available batches (one or more orders) that the shoppers may choose to fulfill. The shoppers thus may have choice in whether to select any particular batch or whether to decline all available batches. Each batch may be offered to many shoppers to increase the likelihood that any one shopper accepts the batch for fulfillment. As there may be many pending batches awaiting acceptance, each offered to many shoppers, shoppers may be presented with an overwhelming number of batches to choose to accept, making it difficult for shoppers to effectively select batches suitable for the shopper. Likewise, as shoppers may opt to fulfill one batch over another (or none at all), some orders may suffer delays until a shopper accepts the order for fulfillment. These various concerns can mean that the efficacy of the overall coordination provided by the online concierge system can suffer as both orders and shoppers can be negatively impacted from shopper choice and the wide availability of batches that may be accepted.

SUMMARY

The online concierge system coordinates order dispatch and fulfillment by making a batch (i.e., one or more orders) available to an expanding number of shoppers over time until the batch is accepted. Rather than providing a batch available to all shoppers who may be candidates to fulfill the batch (e.g., shoppers eligible for the batch based on order type, distance, and/or other factors), the shoppers are scored with respect to the batch and a subset of shoppers are selected based on the scoring (e.g., from the candidate shoppers) and the subset is offered to fulfill the order. The selected subset may be sent a notification (e.g., a push notification) requesting the shopper accept the batch for fulfillment. After an amount of time passes after notifying the subset of candidates and the batch has not been accepted, an additional subset of candidates may be selected and notified to increase the number of shoppers that may accept the batch. Until the batch is accepted for fulfillment by a shopper, the selection and notification of additional shoppers may be repeated (e.g., at a frequency). In additional embodiments, shoppers may also request an available batch list indicating available batches that may be accepted by the shopper (e.g., in lieu of or in addition to notification-based acceptance). When a shopper is selected to be offered the batch for fulfillment, the batch may be added to that shopper's list of available orders. In some embodiments, the batch is added to the list of available orders for each notified user; in other embodiments, the batch may be added to the available batch list for additional or different shoppers than the shoppers that initially receive the notification.

The frequency at which additional shoppers are selected to be offered the batch may be relatively short (e.g., 5-20 seconds), such that the notified shoppers have an opportunity to review and accept the batch without the system waiting for shoppers to decline before offering the batch to additional shoppers. In additional embodiments, the candidate shoppers may also be updated at another rate/frequency (e.g., 1-5 minutes) that may differ from the rate/frequency that additional shoppers are offered the batch for fulfillment. As such, in some embodiments, as the candidate shoppers may be scored and/or ranked before the selection of candidate shoppers are to be offered the batch for fulfillment, the additional shoppers to be offered the batch may be determined with minimal additional computation by selecting the next top-n users from the scored candidate shoppers. This may allow the set of offered candidate shoppers to expand with limited computation, while the candidate shopper list itself is also updated to account for changes in available shoppers.

The scoring for a shopper with respect to a batch may include a scoring function that predicts the likelihood that a shopper will accept the batch for fulfillment and/or is expected to reduce other resource costs for fulfillment. The scoring function may thus account for various factors such as shopper characteristics, order characteristics, expected time to accept an order by the shopper, distance or other costs, and so forth. As such, the scoring may prioritize shoppers with reduced resource costs and cause the orders to initially be sent to shoppers who may have lower costs (e.g., expected travel time or distance) and then to shoppers with increasing costs, improving the overall efficiency of fulfillment via batch-shopper matching and reducing such costs to the system overall. Similarly, the number of shoppers selected for the batch may be a fixed amount or may be variable based on the batch and/or the selected shoppers.

In addition, while this disclosure is generally in the context of batched orders for fulfillment by shoppers, the disclosure herein is also applicable more generally to online coordination systems that distribute and manage quantities of work to relatively independent agents that may decline or accept a given requested workload. Such agents may include, for example, computing devices that may choose to process a computational workload based on various factors, but which the coordination system may not dictate. In these variations, the coordination system may select a subset of candidate agents for performing the workload, notify the subset of agents, and select/notify additional agents after an amount of time if the notified agents do not accept the work. As such, the principles of this disclosure may be applied more broadly to coordination of many kinds of workloads across autonomous (or semi-autonomous) workers (including automated or computing systems) that may accept or reject work. This may be particularly relevant, for example, for coordinating among agents that may have different capabilities or priorities that may not be effectively accounted for by a centralized system, such that the agents are configured to independently determine whether to accept or refuse a proposed workload.

Thus, the online concierge system provides an effective way to improve both the notification of shoppers (or other work-agents) for receiving and accepting a batch and the time for an order to be selected and fulfilled, without affecting the autonomous acceptance of batches by shoppers.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Architecture

Figure 1:
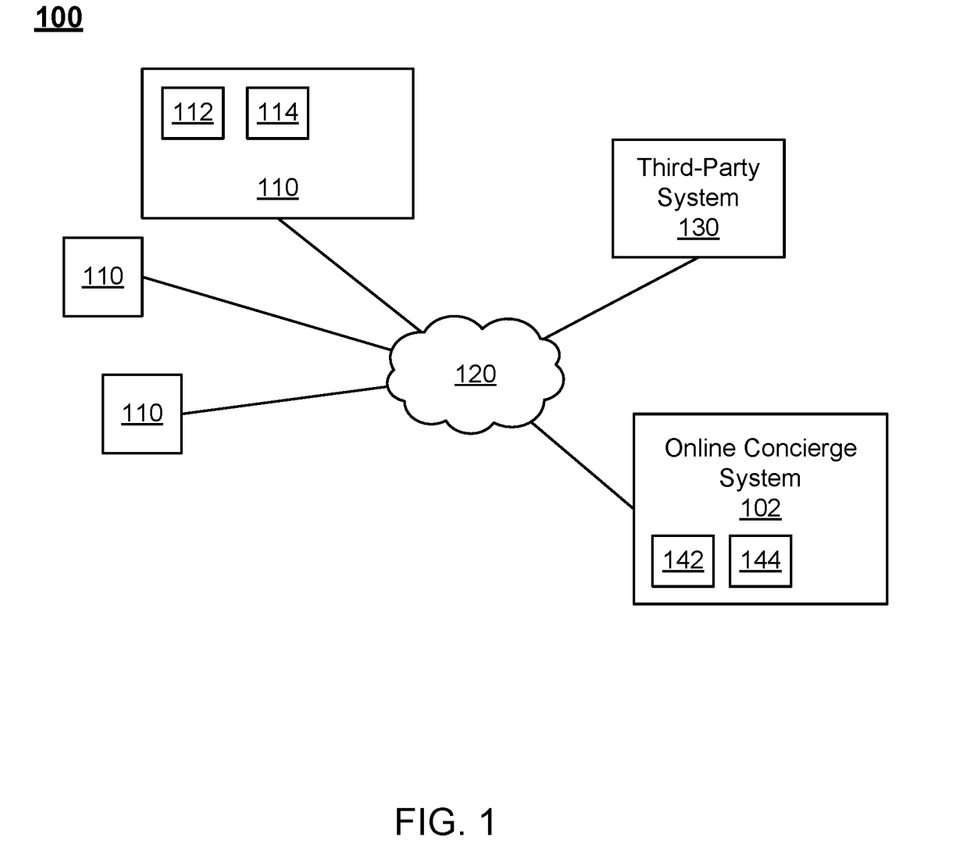
FIG. 1 is a block diagram of a system environment in which an online system operates, such as an online concierge system, according to one or more embodiments.

FIG. 1 is a block diagram of a system environment 100 in which an online system operates, such as an online concierge system 102, as further described below in conjunction with FIGS. 2 and 3, according to one or more embodiments. The system environment 100 shown by FIG. 1 comprises one or more client devices 110, a network 120, one or more third-party systems 130, and the online concierge system 102. In alternative configurations, different and/or additional components may be included in the system environment 100. Additionally, in other embodiments, the online concierge system 102 may be replaced by an online system configured to retrieve content for display to users and to transmit the content to one or more client devices 110 for display.

The online concierge system 102 may receive orders from users for delivery by a "shopper" who may retrieve items for the order from a physical location, such as a store or warehouse, and deliver the items to the user's designated location. From among the current orders and shoppers available to fulfill them, the online concierge system 102 determines which shoppers are candidates to fulfill each order (typically organized into batches of one or more orders) and iteratively increases the shoppers eligible to accept the order for fulfillment until a shopper accepts the order. As shoppers are selected as eligible to accept the order, the shoppers may be notified by a message after which the online concierge system may wait an amount of time before selecting additional shoppers to notify. By iteratively increasing the selected shoppers (e.g., rather than notifying all shoppers), the available batches for each individual shopper is more focused to relevant orders and each order may have a reduced time to accept by a shopper. Additional features of the environment 100 and the online concierge system 102 are further discussed below.

The client devices 110 are one or more computing devices capable of receiving user input as well as transmitting and/or receiving data via the network 120. In one or more embodiments, a client device 110 is a computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one or more embodiments, a client device 110 executes an application allowing a user of the client device 110 to interact with the online concierge system 102. For example, the client device 110 executes a customer mobile application 206 or a shopper mobile application 212, as shown in FIG. 2 and is further described below in conjunction with FIGS. 4A and 4B, respectively, to enable interaction between the client device 110 and the online concierge system 102. As another example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™.

A client device 110 includes one or more processors 112 configured to control operation of the client device 110 by performing functions. In various embodiments, a client device 110 includes a memory 114 comprising a non-transitory storage medium on which instructions are encoded. The memory 114 may have instructions encoded thereon that, when executed by the processor 112, cause the processor to perform functions to execute the customer mobile application 206 or the shopper mobile application 212 to provide the functions further described above in conjunction with FIGS. 4A and 4B, respectively.

The client devices 110 are configured to communicate via the network 120, which may comprise any combination of local area and/or wide area networks, using both wired and/or wireless communication systems. In one or more embodiments, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online concierge system 102 or with the one or more client devices 110. In one or more embodiments, a third-party system 130 is an application provider communicating information describing applications for execution by a client device 110, or communicating data to client devices 110 for use by an application executing on the client device. In other embodiments, a third-party system 130 provides content or other information for presentation via a client device 110. For example, the third-party system 130 stores one or more web pages and transmits the web pages to a client device 110 or to the online concierge system 102. The third-party system 130 may also communicate information to the online concierge system 102, such as advertisements, content, or information about an application provided by the third-party system 130.

The online concierge system 102 includes one or more processors 142 configured to control operation of the online concierge system 102 by performing functions. In various embodiments, the online concierge system 102 includes a memory 144 comprising a non-transitory storage medium on which instructions are encoded. The memory 144 may have instructions encoded thereon corresponding to the modules further below that, when executed by the processor 142, cause the processor to perform the described functionality. Additionally, the online concierge system 102 includes a communication interface configured to connect the online concierge system 102 to one or more networks, such as the network 120, or to otherwise communicate with devices (e.g., client devices 110) connected to the one or more networks.

One or more of a client device 110, a third-party system 130, or the online concierge system 102 may be special-purpose computing devices configured to perform specific functions as further described below, and may include specific computing components such as processors, memories, communication interfaces, and the like.

System Overview

Figure 2:
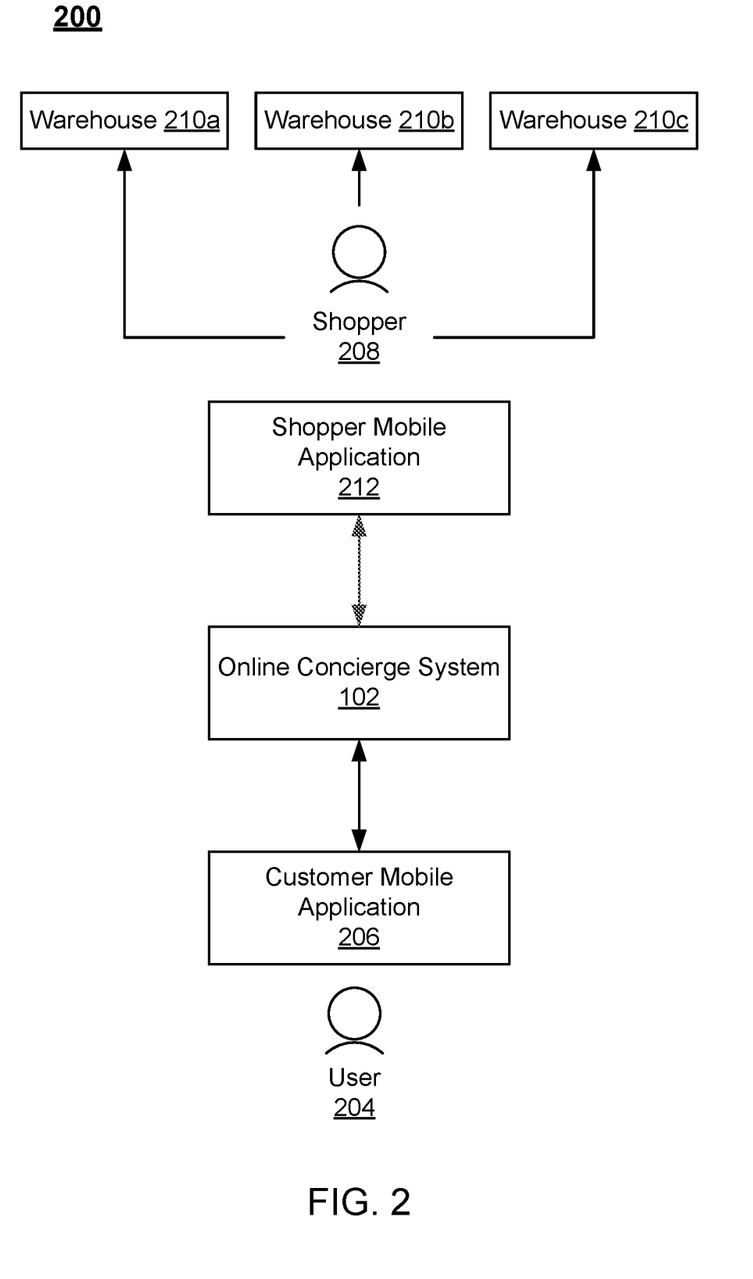
FIG. 2 illustrates an environment of an online platform, such as an online shopping concierge system, according to one or more embodiments.

FIG. 2 illustrates an environment 200 of an online platform, such as an online concierge system 102, according to one or more embodiments. The figures use like-reference numerals to identify like-elements. A letter after a reference numeral, such as "210a," indicates that the text refers specifically to the element having that particular reference numeral. A reference numeral in the text without a following letter, such as "210," refers to any or all of the elements in the figures bearing that reference numeral. For example, "210" in the text refers to reference numerals "210a" or "210b" in the figures.

The environment 200 includes an online concierge system 102. The online concierge system 102 is configured to receive orders from one or more users 204 (only one is shown for the sake of simplicity). An order specifies a list of goods (items or products) to be delivered to the user 204. The order also specifies the location to which the goods are to be delivered and may also specify a preferred time window during which the goods should be delivered. In certain circumstances, the online concierge system 102 may provide an arrival prediction or arrival guarantee services for an order, such that the online concierge system 102 may guarantee a delivery by a particular time based on a predicted arrival time output by a computer model. In various embodiments, the online concierge system 102 may selectively provide (i.e., provide or not provide) these arrival services; in some embodiments, when the arrival services are not offered, the user 204 may still place an order, but without any predicted or guaranteed delivery time. In some embodiments, the order specifies one or more retailers from which the selected items should be purchased. The user may use a customer mobile application (CMA) 206 to place the order; the CMA 206 is configured to communicate with the online concierge system 102.

The online concierge system 102 is configured to transmit orders received from users 204 to one or more shoppers 208. A shopper 208 may be a contractor, employee, other person (or entity), robot, or other autonomous device enabled to fulfill orders received by the online concierge system 102. The shopper 208 travels between a warehouse and a delivery location (e.g., the user's home or office). A shopper 208 may travel by car, truck, bicycle, scooter, foot, or other mode of transportation. In some embodiments, the delivery may be partially or fully automated, e.g., using a self-driving car. The environment 200 also includes three warehouses 210a, 210b, and 210c (only three are shown for the sake of simplicity; the environment could include hundreds of warehouses). The warehouses 210 may be physical retailers, such as grocery stores, discount stores, department stores, etc., or non-public warehouses storing items that can be collected and delivered to users 204. Each shopper 208 fulfills an order received from the online concierge system 102 at one or more warehouses 210, delivers the order to the user 204, or performs both fulfillment and delivery. In one or more embodiments, shoppers 208 make use of a shopper mobile application (SMA) 212, which is configured to interact with the online concierge system 102.

Figure 3:
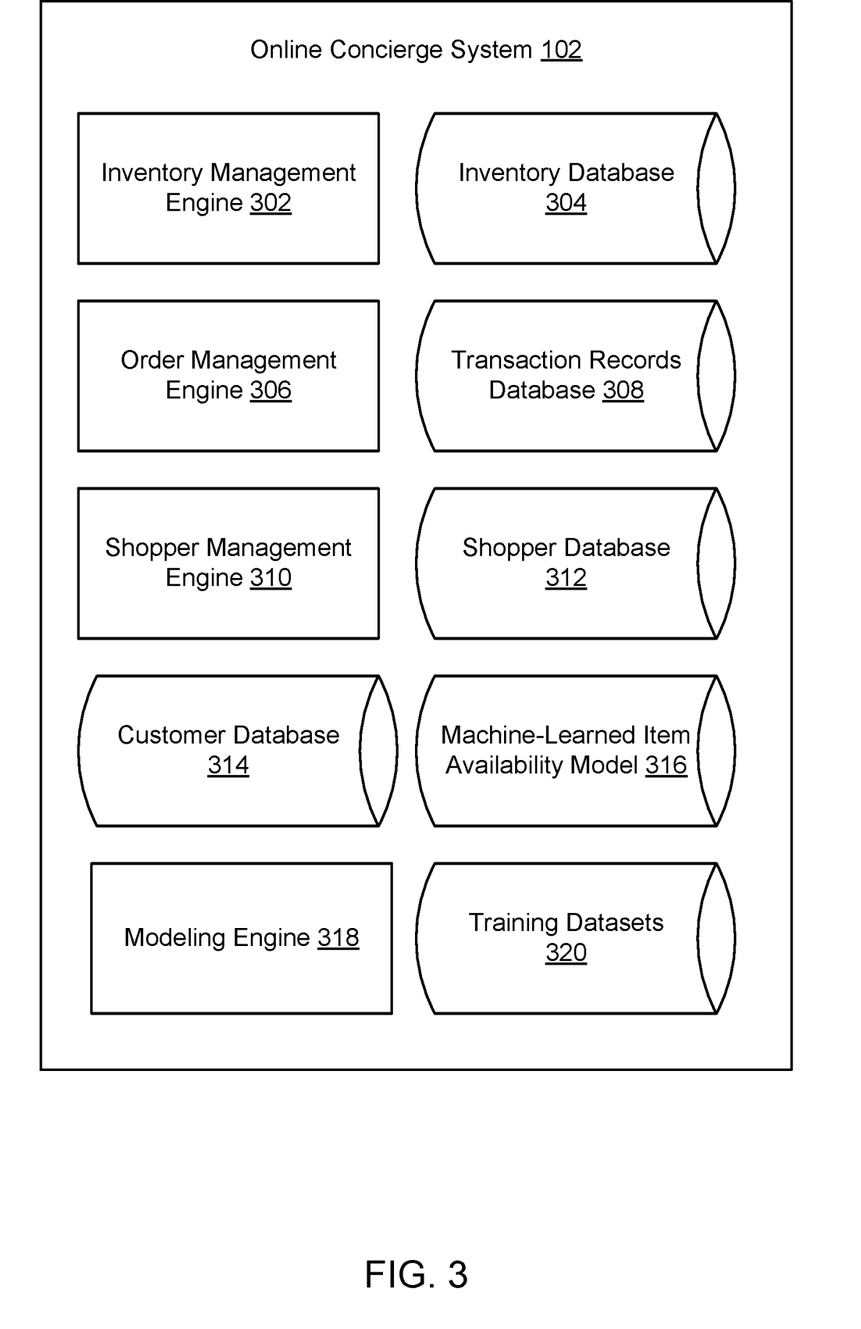
FIG. 3 is a diagram of an online shopping concierge system, according to one or more embodiments.

FIG. 3 is a diagram of an online concierge system 102, according to one or more embodiments. In various embodiments, the online concierge system 102 may include different or additional modules than those described in conjunction with FIG. 3. Further, in some embodiments, the online concierge system 102 includes fewer modules than those described in conjunction with FIG. 3.

The online concierge system 102 includes an inventory management engine 302, which interacts with inventory systems associated with each warehouse 210. In one or more embodiments, the inventory management engine 302 requests and receives inventory information maintained by the warehouse 210. The inventory of each warehouse 210 is unique and may change over time. The inventory management engine 302 monitors changes in inventory for each participating warehouse 210. The inventory management engine 302 is also configured to store inventory records in an inventory database 304. The inventory database 304 may store information in separate records—one for each participating warehouse 210—or may consolidate or combine inventory information into a unified record. Inventory information includes attributes of items that include both qualitative and quantitative information about the items, including size, color, weight, stock keeping unit (SKU), serial number, and so on. In one or more embodiments, the inventory database 304 also stores purchasing rules associated with each item, if they exist. For example, age-restricted items such as alcohol and tobacco are flagged accordingly in the inventory database 304. Additional inventory information useful for predicting the availability of items may also be stored in the inventory database 304. For example, for each item-warehouse combination (a particular item at a particular warehouse), the inventory database 304 may store a time that the item was last found, a time that the item was last not-found (a shopper looked for the item but could not find it), the rate at which the item is found, and the popularity of the item.

For each item, the inventory database 304 identifies one or more attributes of the item and any corresponding values (i.e., attribute values) for each attribute of an item. For example, the inventory database 304 includes an entry for each item offered by a warehouse 210, with an entry for an item including an item identifier that uniquely identifies the item. The entry includes different fields, with each field corresponding to an attribute of the item. A field of an entry includes a value for the attribute corresponding to the attribute for the field, allowing the inventory database 304 to maintain values of different categories for various items. In various embodiments, the attributes may be provided by or may be based on information specified by a warehouse, item catalog, or other external source.

In additional embodiments, attributes to be used for characterizing items and/or the particular attribute values for an attribute of an item (e.g., a product) may be extracted, predicted, or inferred by a computer model of the online concierge system 102. In various embodiments, the attributes for an item may be based on a set of attributes and associated attribute values identified for items in an associated category. That is, each category of item (an item category) may have an associated set of attributes used to characterize items in that category. Each attribute for a category may have different values that may differ across different item categories. For example, the attribute "flavor" for the item category "Yogurt" may include items having attribute values of [non-flavored, strawberry, peach], while the "flavor" attribute for the item category "snack bar" may have items with attribute values of [granola, raisin, chocolate]. Attributes of various items may be identified by computer models that infer attributes based on information about an item.

In various embodiments, the inventory management engine 302 maintains a taxonomy of items offered for purchase by one or more warehouses 210. For example, the inventory management engine 302 receives an item catalog from a warehouse 210 identifying items offered for purchase by the warehouse 210. From the item catalog, the inventory management engine 302 determines a taxonomy of items offered by the warehouse 210. Different levels in the taxonomy may provide different levels of specificity about the items included in the levels. In various embodiments, the taxonomy identifies a category and associates one or more specific items with a specific category. For example, a category identifies "milk," and the taxonomy associates identifiers of different milk items (e.g., milk offered by different brands, milk having one or more different attributes, etc.) with that category. Thus, the taxonomy maintains associations between a category and specific items offered by the warehouse 210 matching the identified category. In some embodiments, different levels in the taxonomy identifies items with differing levels of specificity based on any suitable attribute or combination of attributes of the items. For example, different levels of the taxonomy specify different combinations of attributes for items, so items in lower levels of the hierarchical taxonomy have a greater number of attributes corresponding to greater specificity in a category, while items in higher levels of the hierarchical taxonomy have a fewer number of attributes, corresponding to less specificity in a category. In various embodiments, higher levels in the taxonomy include less detail about items, so greater numbers of items are included in higher levels (e.g., higher levels include a greater number of items satisfying a broader category). Similarly, lower levels in the taxonomy include greater detail about items, so fewer numbers of items are included in the lower levels (e.g., higher levels include a fewer number of items satisfying a more specific category). The taxonomy may be received from a warehouse 210 in various embodiments. In other embodiments, the inventory management engine 302 applies a trained classification module to an item catalog received from a warehouse 210 to include different items in the levels of the taxonomy, so application of the trained classification model associates specific items with categories corresponding to levels within the taxonomy.

The online concierge system 102 also includes an order management engine 306, which is configured to synthesize and display an ordering interface to each user 204 (for example, via the customer mobile application 206). The order management engine 306 is also configured to access the inventory database 304 to determine which products are available at which specific warehouse 210. The order management engine 306 may supplement the product availability information from the inventory database 304 with an item availability predicted by a machine-learned item availability model 316. The order management engine 306 determines a sale price for each item ordered by a user 204. Prices set by the order management engine 306 may or may not be identical to other prices determined by retailers (such as a price that users 204 and shoppers 208 may pay at the retail warehouses). The order management engine 306 also facilitates any transaction associated with each order.

The order management engine 306 may also provide an arrival prediction service with an estimated arrival time provided by one or more computer models to predict an arrival time for an order and whether to use the predicted arrival time for providing related arrival prediction services. The arrival prediction services may include services at different service levels that may refer to different priority levels or service guarantees, such as express, priority, or normal delivery speeds. As such, for orders requested under a normal delivery speed, when the arrival prediction services are available, the output of the delivery prediction model may be used to offer a delivery time in accordance with the predicted delivery time. In some circumstances, the predicted arrival time and related services may be deactivated for one level of service (e.g., normal) and maintained for other levels of service (e.g., priority or express). As such, the arrival prediction services for different levels may be selectively offered at different times.

In one or more embodiments, the order management engine 306 charges a payment instrument associated with a user 204 when he/she places an order. The order management engine 306 may transmit payment information to an external payment gateway or payment processor. The order management engine 306 stores payment and transactional information associated with each order in a transaction records database 308.

In various embodiments, the order management engine 306 generates and transmits a search interface to a client device 110 of a user 204 for display via the customer mobile application 206. The order management engine 306 receives a query comprising one or more terms from a user 204 and retrieves items satisfying the query, such as items having descriptive information matching at least a portion of the query made by the user 204. In various embodiments, the order management engine 306 uses item embeddings to retrieve specific items based on a received query. For example, the order management engine 306 generates an embedding for a query and determines the measures of similarity between the embedding for the query and item embeddings for various items included in the inventory database 304.

In addition, the order management engine 306 may use attributes, including predicted or inferred attributes, for scoring, filtering, or otherwise evaluating the relevance of items as responsive to the order query. As such, the attributes predicted (i.e., inferred) may be added to the inventory database 304 and used to improve various further uses and processing of the item information, of which an order query is one example. In general, the additional attributes of an item that may be predicted by the system may be used for a variety of purposes according to the particular embodiment, type of item, predicted attributes, etc.

To use attributes for an order query, attributes relevant to the order query may be determined from the order query. The attributes may be explicitly designated or may be inferred from the order or from the user placing the order. For example, an order query may provide a text search for "milk" and specify that results to the query should include only items with the attribute "dairy-free." In other examples, a particular user may be associated with dietary restrictions or other attribute preferences and indicate that the online concierge system 102 may automatically apply these preferences to queries or orders from that particular user.

In some embodiments, the order management engine 306 also shares order details with warehouses 210. For example, after successful fulfillment of an order, the order management engine 306 may transmit a summary of the order to the appropriate warehouses 210. The summary may indicate the items purchased, the total value of the items, and in some cases, an identity of a shopper 208 and a user 204 associated with the transaction. In one or more embodiments, the order management engine 306 pushes the transaction and/or order details asynchronously to associated retailer systems. This may be accomplished via use of webhooks, which enable programmatic or system-driven transmission of information between web applications. In another embodiment, retailer systems may be configured to periodically poll the order management engine 306, which provides details of all orders which have been processed since the last poll request.

The order management engine 306 may interact with a shopper management engine 310, which manages communication with and utilization of shoppers 208. In one or more embodiments, the shopper management engine 310 receives a new order from the order management engine 306. The shopper management engine 310 identifies the appropriate warehouse 210 to fulfill the order based on one or more parameters, such as a probability of item availability determined by a machine-learned item availability model 316, the contents of the order, the inventory of the warehouses, and the proximity to the delivery location. The shopper management engine 310 then identifies one or more appropriate shoppers 208 to fulfill the order based on one or more parameters, such as the shoppers' proximity to the appropriate warehouse 210 (and/or to the user 204), his/her familiarity level with that particular warehouse 210, and so on. Additionally, the shopper management engine 310 accesses a shopper database 312, which stores information describing each shopper 208, such as his/her name, rating, previous shopping history, and so on.

As part of fulfilling an order, the order management engine 306 and/or shopper management engine 310 may access a customer database 314 which stores information describing each user 204 (e.g., a customer). This information may include each user's name, address, shopping preferences, favorite items, stored payment instruments, and so on.

In various embodiments, the order management engine 306 determines whether to delay display of a received order to shoppers 208 for fulfillment by a time interval. In response to determining to delay the received order by a time interval, the order management engine 306 evaluates orders received after the received order and during the time interval for inclusion in one or more batches that also includes the received order. After the time interval, the order management engine 306 displays the order to one or more shoppers 208 via the shopper mobile application 212; if the order management engine 306 generated one or more batches including the received order and one or more orders received after the received order and during the time interval, the one or more batches are also displayed to one or more shoppers 208 via the shopper mobile application 212.

The shopper management engine 310 may thus coordinate assignment of batches (one or more orders) for fulfillment by a shopper 208. As shoppers may generally have discretion, individual shoppers may elect to accept or decline a batch for fulfillment and may in some cases accept particular batches at a relatively low rate (e.g., <10, 20, 30, or 50%), the shopper management engine 310 may iteratively offer a particular batch to an increasing number of shoppers 208 over time. When a batch is offered to a particular shopper, the shopper may be notified by a message sent from the online concierge system 102 (e.g., via a push notification), or the order may be added to a list of available orders for the shopper when the shopper accesses the online concierge system 102 to identify orders that may be accepted by the shopper. The coordination and selection of shoppers for a batch is further discussed below, particularly with respect to FIGS. 5 & 6.

Machine Learning Models—Item Availability

The online concierge system 102 further includes a machine-learned item availability model 316, a modeling engine 318, and training datasets 320. The modeling engine 318 uses the training datasets 320 to generate one or more machine-learned models, such as the machine-learned item availability model 316. The machine-learned item availability model 316 can learn from the training datasets 320, rather than follow only explicitly programmed instructions. The inventory management engine 302, order management engine 306, and/or shopper management engine 310 can use the machine-learned item availability model 316 to determine a probability that an item is available at a warehouse 210. The machine-learned item availability model 316 may be used to predict item availability for items being displayed to a user, selected by a user, or included in received delivery orders. The machine-learned item availability model 316 may be used to predict the availability of any number of items.

The machine-learned item availability model 316 can be configured to receive, as inputs, information about an item, the warehouse for picking the item, and the time for picking the item. The machine-learned item availability model 316 may be adapted to receive any information that the modeling engine 318 identifies as indicators of item availability. At minimum, the machine-learned item availability model 316 receives information about an item-warehouse pair, such as an item in a delivery order and a warehouse at which the order could be fulfilled. Items stored in the inventory database 304 may be identified by item identifiers. As described above, various characteristics, some of which are specific to the warehouse (e.g., a time that the item was last found in the warehouse, a time that the item was last not found in the warehouse, the rate at which the item is found, and the popularity of the item), may be stored for each item in the inventory database 304. Similarly, each warehouse may be identified by a warehouse identifier and stored in a warehouse database along with information about that warehouse. A particular item at a particular warehouse may be identified using an item identifier and a warehouse identifier. In other embodiments, the item identifier refers to a particular item at a particular warehouse, so that the same item at two different warehouses is associated with two different identifiers unique to the two warehouses. For convenience, both of these options to identify an item at a warehouse are referred to herein as an "item-warehouse pair." Based on the identifier(s), the online concierge system 102 can extract information about the item and/or warehouse from the inventory database 304 and/or warehouse database and provide this extracted information as inputs to the machine-learned item availability model 316.

The machine-learned item availability model 316 contains a set of functions generated by the modeling engine 318 from the training datasets 320 that relate the item, warehouse, timing information, and/or any other relevant inputs, to the probability that a particular item is available at a particular warehouse. Thus, for a given item-warehouse pair, the machine-learned item availability model 316 outputs a probability that the item is available at the warehouse. The machine-learned item availability model 316 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 316 includes a confidence score. The confidence score may be an error or uncertainty score of the output availability probability and may be calculated using any standard statistical error measurement. In some examples, the confidence score is based, in part, on whether the item-warehouse pair availability prediction was accurate for previous delivery orders (e.g., if the item was predicted to be available at the warehouse and was not found by the shopper or predicted to be unavailable but found by the shopper). In some examples, the confidence score is based, in part, on the age of the data for the item, e.g., if availability information has been received within the past hour or the past day. The set of functions of the machine-learned item availability model 316 may be updated and adapted following retraining with new training datasets 320. The machine-learned item availability model 316 may be any machine-learning model, such as a neural network, boosted tree, gradient boosted tree, or random forest model. In some examples, the machine-learned item availability model 316 is generated from XGBoost algorithm.

The training datasets 320 includes training data from which the machine-learned models may learn parameters, such as weights, model structure, and other aspects for developing predictions. For the machine-learned item availability model 316, the training datasets 320 may relate a variety of different factors to known item availabilities from the outcomes of previous delivery orders (e.g., if an item was previously found or previously unavailable). The training datasets 320 includes the items included in previous delivery orders, whether the items in previous delivery orders were picked, the warehouses associated with the previous delivery orders, and a variety of characteristics associated with each of the items (which may be obtained from the inventory database 304). Each piece of data in the training datasets 320 includes the outcome of a previous delivery order (e.g., if the item was picked or not). The item characteristics may be determined by the machine-learned item availability model 316 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 316 may weigh these factors differently, where the weights are a result of a "learning" or training process on the training datasets 320. The training datasets 320 are very large datasets taken across a wide cross-section of warehouses, shoppers, items, delivery orders, times, and item characteristics. The training datasets 320 are large enough to provide a mapping from an item in an order to a probability that the item is available at a warehouse. In addition to previous delivery orders, the training datasets 320 may be supplemented by inventory information provided by the inventory management engine 302. In some examples, the training datasets 320 are historic delivery order information used to train the machine-learned item availability model 316, whereas the inventory information stored in the inventory database 304 include factors input into the machine-learned item availability model 316 to determine an item availability for an item in a newly received delivery order. In some examples, the modeling engine 318 may evaluate the training datasets 320 to compare a single item's availability across multiple warehouses to determine if an item is chronically unavailable. This may indicate that an item is no longer manufactured. The modeling engine 318 may query a warehouse 210 through the inventory management engine 302 for updated item information on these identified items.

The training datasets 320 include a time associated with previous delivery orders. In some embodiments, the training datasets 320 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 320 include a day of the week previous delivery orders were placed. The day of the week may impact item availability since popular shopping days may have reduced inventory of particular items, or restocking shipments may be received on particular days. In some embodiments, training datasets 320 include a time interval since an item was previously picked in a previously delivered order. If a particular item has recently been picked at a warehouse, this may increase the probability that it is still available. If there has been a long time interval since a particular item has been picked, this may indicate that the probability of that item being available for subsequent orders is low or uncertain. In some embodiments, training datasets 320 include a time interval since an item was not found in a previous delivery order. If there has been a short time interval since an item was not found, this may indicate that there is a low probability that the item is available in subsequent delivery orders. And conversely, if there has been a long time interval since an item was not found, this may indicate that the item may have been restocked and is available for subsequent delivery orders. In some examples, training datasets 320 may also include a rate at which an item is typically found by a shopper at a warehouse, a number of days since inventory information about the item was last received from the inventory management engine 302, a number of times an item was not found in a previous week, or any number of additional rate or time information. The relationships between the time information and item availability are determined by the modeling engine 318 training a machine-learning model with the training datasets 320, producing the machine-learned item availability model 316.

The training datasets 320 includes item characteristics. In some examples, the item characteristics include a department associated with the item. For example, if the item is yogurt, it is associated with the dairy department. A department may be categorized as the bakery, beverage, nonfood and pharmacy, produce and floral, deli, prepared foods, meat, seafood, dairy, or any other categorization of items used by the warehouse. The department associated with an item may affect item availability, since different departments have different item turnover rates and inventory levels. In some examples, an item's characteristics include an aisle of the warehouse associated with the item. The aisle of the warehouse may affect item availability since different aisles of a warehouse may be more frequently re-stocked than others. Additionally, or alternatively, the item characteristics include an item popularity score. The item popularity score for an item may be proportional to the number of delivery orders received that included that particular item. An alternative or additional item popularity score may be provided by a retailer through the inventory management engine 302. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger or smaller inventories in the warehouses. In some examples, the item characteristics may include a number of times a shopper was instructed to keep looking for an item after he or she was initially unable to find the item, a total number of delivery orders received for the item, whether or not the product is organic, vegan, gluten free, or any other characteristics associated with an item. The relationships between item characteristics and item availability are determined by the modeling engine 318 training a machine-learning model with the training datasets 320, producing the machine-learned item availability model 316.

The training datasets 320 may include additional item characteristics that affect item availability and can therefore be used to build the machine-learned item availability model 316 relating the delivery order for an item to its predicted availability. The training datasets 320 may be periodically updated with recent previous delivery orders. The training datasets 320 may be updated with item availability information provided directly from shoppers 208. Following updating of the training datasets 320, a modeling engine 318 may retrain a model with the updated training datasets 320 and produce a new machine-learned item availability model 316.

Customer Mobile Application

Figure 4A:
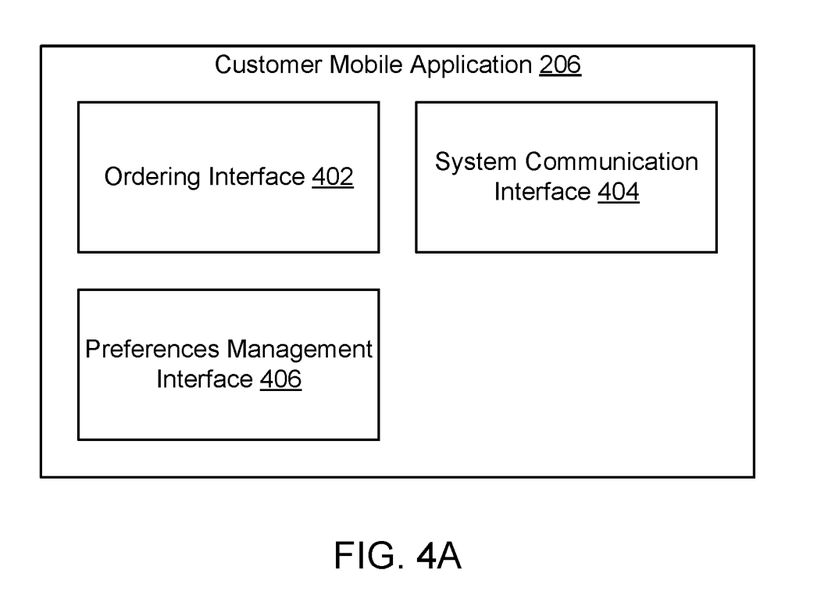
FIG. 4A is a diagram of a customer mobile application (CMA), according to one or more embodiments.

FIG. 4A is a diagram of the customer mobile application (CMA) 206, according to one or more embodiments. The CMA 206 includes an ordering interface 402, which provides an interactive interface with which the user 204 can browse through and select items/products and place an order. The CMA 206 also includes a system communication interface 404 which, among other functions, receives inventory information from the online concierge system 102 and transmits order information to the online concierge system 102. The CMA 206 also includes a preferences management interface 406, which allows the user 204 to manage basic information associated with his/her account, such as his/her home address and payment instruments. The preferences management interface 406 may also allow the user 204 to manage other details such as his/her favorite or preferred warehouses 210, preferred delivery times, special instructions for delivery, and so on.

Shopper Mobile Application

Figure 4B:
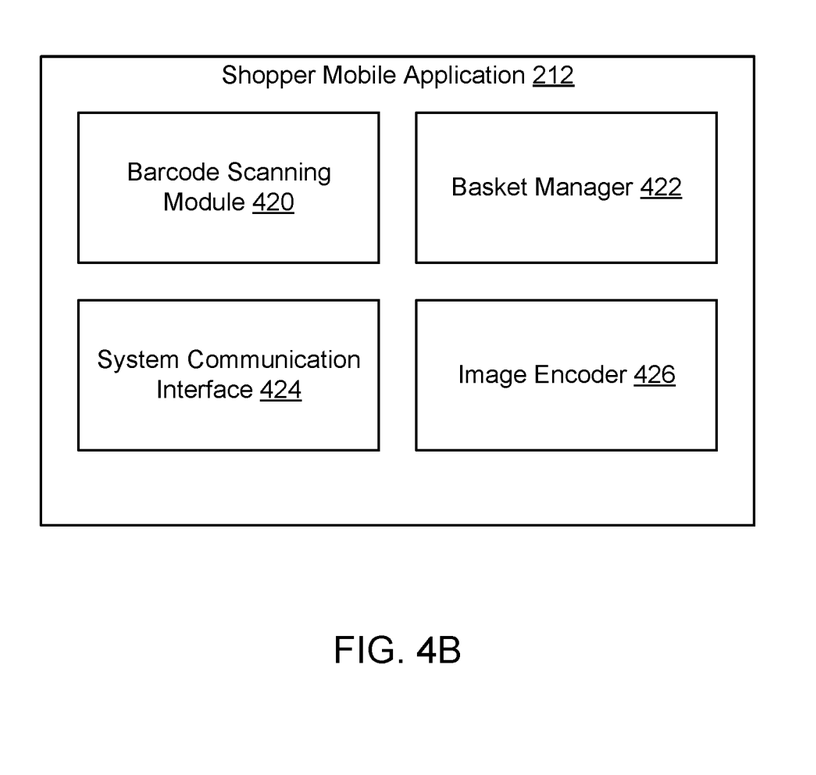
FIG. 4B is a diagram of a shopper mobile application (SMA), according to one or more embodiments.

FIG. 4B is a diagram of a shopper mobile application (SMA) 212, according to one or more embodiments. The SMA 212 includes a barcode scanning module 420 which allows a shopper 208 to scan an item at a warehouse 210 (such as a can of soup on the shelf at a grocery store). The barcode scanning module 420 may also include an interface which allows the shopper 208 to manually enter information describing an item (such as its serial number, SKU, quantity and/or weight) if a barcode is not available to be scanned. SMA 212 also includes a basket manager 422, which maintains a running record of items collected by the shopper 208 for purchase at a warehouse 210. This running record of items is commonly known as a "basket." In one or more embodiments, the barcode scanning module 420 transmits information describing each item (such as its cost, quantity, weight, etc.) to the basket manager 422, which updates its basket accordingly. The SMA 212 also includes a system communication interface 424, which interacts with the online concierge system 102. For example, the system communication interface 424 receives an order from the online concierge system 102 and transmits the contents of a basket of items to the online concierge system 102. The SMA 212 also includes an image encoder 426, which encodes the contents of a basket into an image. For example, the image encoder 426 may encode a basket of goods (with an identification of each item) into a quick response (QR) code, which can then be scanned by an employee of the warehouse 210 at check-out.

Order-Shopper Matching and Fulfillment

Figure 5:
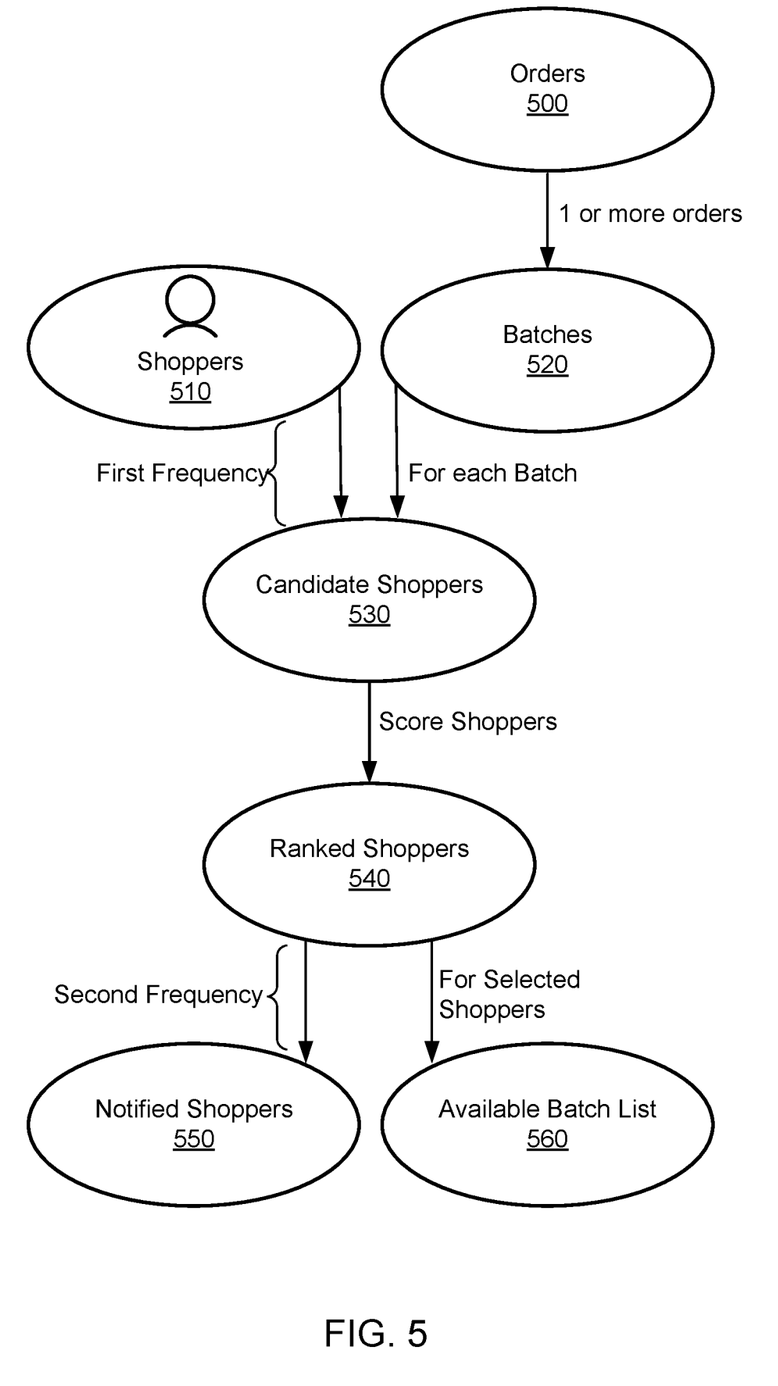
FIG. 5 shows an example flowchart for notifying shoppers of an order to be accepted for fulfillment, according to one or more embodiments.

FIG. 5 shows an example flowchart for notifying shoppers of an order to be accepted for fulfillment, according to one or more embodiments. As discussed above, individual shoppers may have discretion to accept or reject a batch (e.g., one or more orders) for fulfillment. At any given time, many shoppers 510 may be available to receive orders but may generally accept a limited number of batches at a time and may have criteria for accepting or rejecting a batch that may be unstated to the online concierge system 102. As such, the orders may be matched to shoppers 510 by offering a particular batch of orders to an increasing number of shoppers 510 until the batch is accepted for fulfillment.

Initially, a number of orders 500 currently awaiting assignment to a shopper 510 for fulfillment may be grouped into batches 520 of one or more orders to be fulfilled together. In other embodiments, the orders are not grouped together, such that each batch may refer to a single order. The orders 500 may thus include any orders that are pending and that are not yet associated with a shopper to fill it. As noted above, the orders 500 may be batched according to any suitable criteria, such as the location at which items for orders are located, the destination/drop-off location of the orders, similarity of items in the order, and so forth. The shoppers 510 may include shoppers who are currently using or recently used the shopper mobile application 212 and thus includes shoppers 510 that are currently looking for or expecting to receive batches 520 to accept for fulfillment.

At any particular time, there may be a large number of shoppers 510 and orders 500 to be matched. Rather than present all orders to all shoppers, each batch is made available for a limited number of shoppers to accept. If the shoppers do not accept a batch 520 within a threshold amount of time, the number of shoppers 510 who are offered the batch 520 is increased iteratively until a shopper accepts the order. The selection of the shoppers to identify is first performed by narrowing the shoppers 510 to a set of candidate shoppers 530 and then selecting the shoppers to be offered the batch (e.g., by a notification), which may be based on a scoring algorithm.

As such, to initially narrow the set of all shoppers 510 to the set that may be relevant to a particular batch 520, a set of candidate shoppers 530 may be identified from the population of shoppers 510. The candidate shoppers 530 represent the shoppers 510 who are eligible to be paired with the particular batch. The candidate shoppers 530 for a batch may be selected in various ways and may include filtering or other scoring criteria to determine whether a particular shopper may be a candidate for a particular batch. In one or more embodiments, the candidate shoppers 530 are identified as the set of shoppers 510 within a geofence, geographic distance or other geographic measurement of the location of a batch. The location of a batch may be determined, e.g., based on the location of the constituent orders or items in the batch. In some embodiments, the candidate shoppers 530 may also be selected based on Boolean or other filters that may indicate whether a shopper could be matched with the batch for delivery. For example, a shopper may have limitations on the particular locations for which the shopper will receive or deliver orders, or an order be associated with preferences or limitations that prevent particular shoppers from fulfilling the order (e.g., the order may include a number of large items that may only be delivered by shoppers with particular types of vehicles).

After identifying the set of candidate shoppers 530, a group of the candidate shoppers (e.g., a subset) is selected to be offered the batch. The particular group of candidate shoppers 530 to notify may be a randomized or semi-randomized subset or may be determined based on scoring or another selection method. For a particular batch, the selected shoppers may be offered the batch by notifying the shoppers that the batch is available for the shoppers to accept for fulfillment, adding the shoppers to a set of notified shoppers 550. This may provide a "push" notification to the shoppers (e.g., via SMA 212) that the shoppers may respond to. In addition, or as an alternative, each shopper may also be associated with an available batch list indicating the available batches that the shopper may accept for fulfillment. In this example, the available batch list 560 may be retrieved and provided to a shopper when the shopper accesses the appropriate interface on the shopper's mobile device (e.g., via the shopper mobile application 212). The selection of a shopper and notification of available batches is further discussed below.

In some embodiments, the selected shoppers to be notified may be based on a score determined for the shopper, which may be based on the particular batch. After determining the set of candidate shoppers 530, each of the candidate shoppers 530 for a batch may then be scored by a scoring algorithm to determine an associated score for the candidate shopper 530 indicating a level of match between each candidate shopper and the batch. The score may represent the quality of a match between a shopper and a batch and may reflect expected resource usage (e.g., time or distance traveled) for the shopper to fulfill the order. As such, the score may be used to prioritize reduced resource usage by shoppers in fulfilling the batch and, across a large number of batches, reduce overall resource usage by many shoppers fulfilling many batches.

In some embodiments, the scoring may then be used to order (e.g., rank) the shoppers according to the predicted match with the batch (e.g., according to the score) as a set of ranked shoppers 540. In some embodiments, similar scoring may also be performed in the selection of the candidate shoppers 530, such that an initial set of candidate shoppers 530 accounts for similar or different factors to those on which shoppers may be scored, from which a set of the candidate shoppers 530 may be determined. In general, the process for identifying the candidate shoppers 530 may be relatively inexpensive in processing or computational usage (even when using further scoring factors) when compared to the scoring of the shoppers to determine the candidate shoppers to select for offering the batch.

The candidate shoppers 530 may be scored with any suitable scoring algorithm and with any suitable factors, which may include one or more computer models that either generate factors for the score or that determine the score itself. In some embodiments, the factors (e.g., which may be features used by a model) may include shopper characteristics, batch characteristics (e.g., based on characteristics of the constituent orders), a shopper's predicted time to accept a batch, a shopper type, and any other suitable characteristics. The "time to accept" (TTA) may be a metric output by a computer model that predicts the likely response time by a shopper (or shoppers generally) based on the characteristics of the shopper and/or the order. In one or more embodiments, the scoring may be based on expected resource usage (e.g., distance or travel time) for a shopper to the batch (e.g., the distance of the shopper to a location for beginning fulfillment of an order in the batch).

The shopper characteristics may include information about a current location of a shopper, order locations (e.g., warehouses, retailers, etc.) that may be preferred by the shopper (either as a stated preference or an implied preference based on historically-accepted batches), distance/time commitment for the batch that may be preferred by the shopper, previous deliveries to a location (e.g., a user to whom prior orders have been delivered), a prediction or preference of how long the shopper is likely to be available within a timeframe (e.g., in the day/week), and other characteristics that may be used to predict the likely match between a shopper and a batch.

Batch characteristics may include similar information describing the distance of the batch, location of the batch, expected travel/delivery time, pickup location(s) (e.g., the type of merchant or particular warehouse), and so forth that may be evaluated in combination with the shopper characteristics. The batch characteristics may also include a metric describing the expected desirability of the batch, which may be determined based on the items in the order, delivery location, and/or other characteristics and may be derived from the relative speed at which similar batches were accepted relative to other batches.

In some embodiments, the scoring may be based on a computer model that predicts a likelihood that the shopper accepts the order when offered (e.g., presented with) the batch for acceptance, which may include any suitable characteristics as features input to the model. In one or more embodiments, the scoring prioritizes shoppers that are relatively close to the location of the batch, with reduced travel time/distance, and/or a reduced "time to accept" by the shopper. As such, the scoring may include aspects that reflect expected resource usage to fulfill a batch (e.g., prioritizing reduced resource usage) and/or aspects reflecting the likelihood the particular shopper accepts the batch for fulfillment (prioritizing reduced time to accept for the batch).

The scoring may then be used to rank the shoppers according to the associated scoring for the users with respect to the batch to generate a list of ranked shoppers 540. A subset of the ranked shoppers may then be selected from the ranked shoppers 540 to offer the batch to. In some embodiments, the shoppers are not explicitly ordered in a ranking, such that the subset of shoppers is selected based on the scores without explicit ranking (e.g., selecting a number of users with scores above a threshold). As a further example, the shoppers may also be selected based on the number of other orders that are currently available for that shopper, such that the shopper may be de-prioritized for selection of this batch when the shopper has a relatively high number of available batches (that the shopper may already choose to accept).

When the subset of shoppers is selected, the shoppers are then notified, e.g., with a push notification message of the order. The subset of selected shoppers may then be added to a list of notified shoppers 550. In addition (or as an alternative), the selected shoppers may also have the order added to the respective shoppers' available batch list 560 from which the notified shoppers 550 may retrieve available batches and select one to accept. After the shoppers are notified or the order is otherwise made available (e.g., on the available batch list), the system may wait to determine whether the order is accepted for fulfillment by the shoppers. After an amount of time passes after the order was made available to the shoppers (e.g., after the shoppers are notified or the order is added to the available batch list), additional shoppers may be selected as available to receive the order (and notified and/or added to the respective available batch lists 560). An additional amount of time may be provided for the order to be accepted after the batch is available for the additional shoppers to accept. As such, in one or more embodiments, the set of shoppers available to accept the order (e.g., notified shoppers 550) is expanded iteratively at a frequency corresponding to the amount of time the system waits for acceptance after each notification.

In some embodiments, the set of candidate shoppers 530 may also be updated as shoppers 510 become available or unavailable to accept any batch (e.g., because the shopper has accepted a batch or is currently fulfilling an order). The set of candidate shoppers 530 may also be updated after another amount of time has passed after the candidate shoppers 530 are determined. When the set of candidate shoppers 530 is updated, the candidate shoppers 530 may also be re-scored to generate a new list of ranked shoppers 540. In another example, the candidate shoppers 530 may be re-scored when new shoppers are selected for notification (e.g., at the second frequency). As such, in one or more embodiments, the candidate shoppers 530 may be updated at one frequency (a first frequency) and the additional shoppers selected for notification at another frequency (a second frequency). In some embodiments, the first frequency may be a lower frequency than the second frequency, such that the list of candidate shoppers 530 remains the same for several iterations of the selection of shoppers to notify 550. As one example, the candidate shoppers may be updated at a frequency (the first frequency) of once a minute, and the additional shoppers may be selected at a frequency (the second frequency) of every ten seconds.

The number of notified shoppers 550 and the frequency of notifying the shoppers may be specific values (e.g., two shoppers selected from the candidate shoppers 530 and notified at a frequency of every ten seconds) or may be dynamic and determined based on various factors. For example, some batches 520 may be comparatively attractive and predicted, based on its characteristics, of being accepted by a shopper more readily. Such batches may be sent to fewer shoppers and/or less frequently expanded to more shoppers compared to batches that score lower on batch attractiveness. As another factor, the relative expected time for a shopper to accept a batch may also affect the number of or the frequency that additional shoppers are selected and notified. For example, a group of shoppers already notified for the order who are generally slower to accept a batch (relative to other shoppers or a shopper average) may mean that the notified shoppers 550 have not yet reviewed and determined whether to accept the batch, rather than the notified shoppers 550 that may decline the batch. As such, fewer additional shoppers may be notified, or the amount of time to wait until adding additional shoppers may be increased to account for the expected longer response time in acceptance by the notified shoppers 550. These factors may also vary based on driving distance/time, number of available shoppers (e.g., candidate shoppers 530), ratio of batches 520 to shoppers 510, amount of time that the batch has been pending without an assigned shopper, etc. As such, the number of notified shoppers 550 (e.g., the number of candidate shoppers 530 selected to be provided the batch for acceptance) may be based on characteristics of the batch and/or any other suitable factors.

Figure 6:
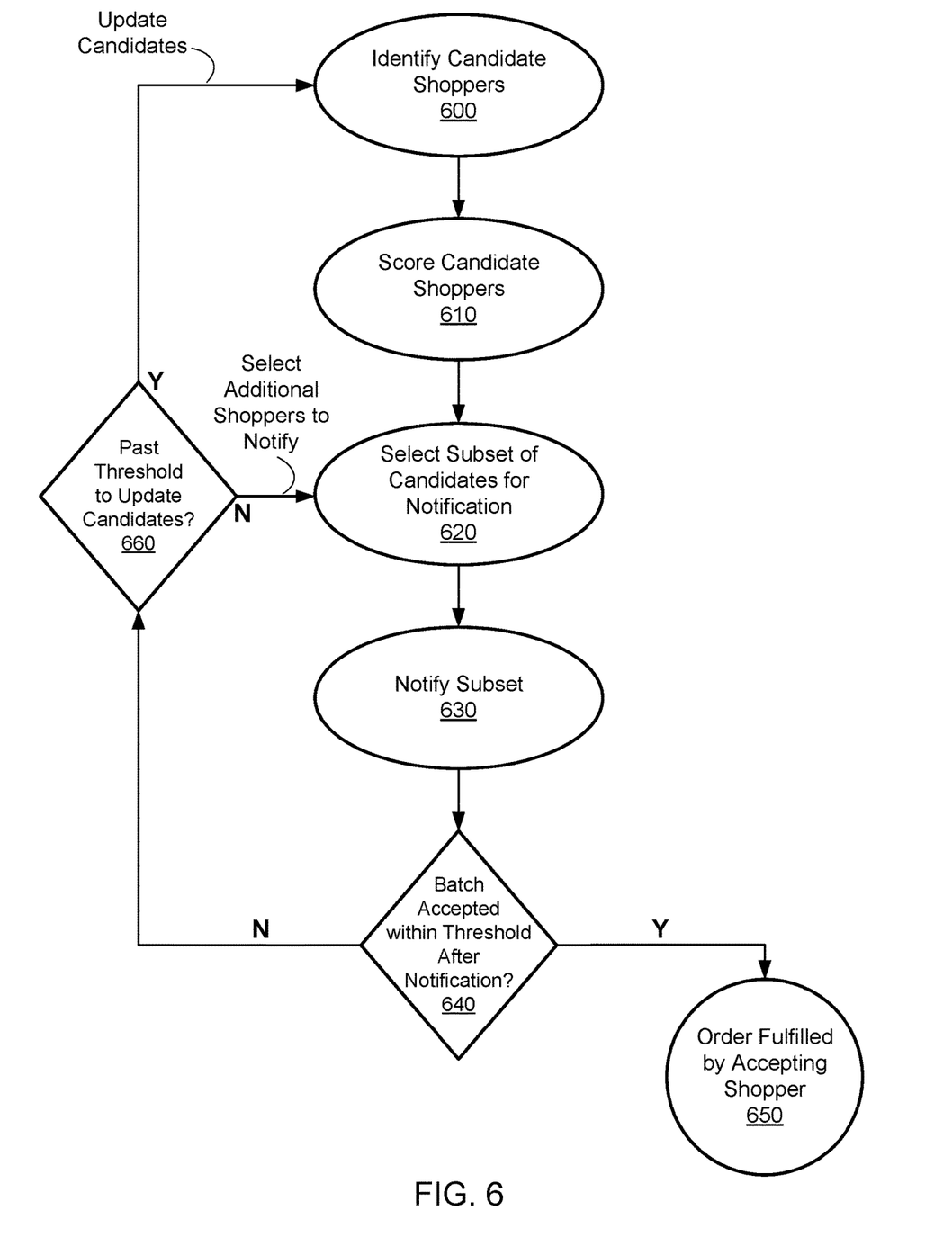
FIG. 6 shows an example flowchart for iteratively expanding the shoppers to receive a batch to be accepted for fulfillment, according to one or more embodiments.

FIG. 6 shows an example flowchart for iteratively expanding the shoppers to receive a batch to be accepted for fulfillment, according to one or more embodiments. This process may be performed, for example, by components of an online concierge system such as online concierge system 102 and components such as the shopper management engine 310. After determining or receiving a batch that is ready to be accepted by a shopper for fulfillment, the process begins by identifying 600 candidate shoppers as discussed above, for example, by identifying shoppers within a geofence or threshold distance of the order. The candidate shoppers may then be scored 610 with respect to the particular batch to determine the quality of a match between the particular batch and the shoppers who may be candidate shoppers to fulfill it. From the candidate shoppers, a number of the candidate shoppers are selected 620 as a subset to be notified of the batch based on the scoring. The selected subset of candidate shoppers may then be notified 630 and the process may wait for a threshold amount of time to determine if any of the notified shoppers accept 640 the batch. After the threshold amount of time passes, if the batch is accepted 640, the order is then fulfilled 650 by the accepting shopper. If the batch is not accepted within the threshold, another threshold may also be evaluated 660 to determine whether to update the candidate shoppers 600. When the other threshold has been passed, the candidate shoppers may be updated; when only the notification threshold is passed, additional shoppers may be selected for notification. While shown in FIG. 6 as sequential threshold evaluations, the notification threshold and the candidate update threshold may independently be evaluated on other embodiments. As such, the shoppers notified for a batch may be iteratively increased until a shopper has accepted the order, increasing the time to accept, reducing travel time and other resource use (e.g., based on the factors such as travel distance used for selecting the shoppers to notify), and reducing the complexity of a shopper's interface in determining which batches may be available to accept.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one or more embodiments, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for fulfilling orders by shoppers having choice to accept an order, the method comprising:
   at a computer system comprising a processor and a computer-readable medium:
   identifying a set of candidate shoppers for fulfilling a batch of one or more orders;
   scoring each candidate shopper for fulfilling the batch, wherein the scoring comprises applying a machine learning model that is trained to predict a likelihood that a shopper would accept a batch of one or more orders if offered, wherein training the machine learning model comprises:
      accessing a training dataset comprising a plurality of training items, each training items comprising a batch of orders, features associated with the batch of orders that reflect resource usage to fulfill the batch of order, and an outcome indicating whether a user received the batch of orders accepts the batch of orders;
      applying the machine learning model to each training item to predict a likelihood that the user would accept the batch of orders in the respective training example;
      updating the training dataset with recent previously delivery orders comprising outcomes of the recent previously delivery orders; and
      updating the machine learning model based on the updated training dataset;
   selecting a subset of the set of candidate shoppers based on the scores;
   sending a notification to one or more devices associated with the subset of the candidate shoppers indicating that the batch is available to be accepted;
   determining that the batch has not been accepted for fulfillment by a shopper within a threshold amount of time after sending the notification; and
   responsive to the determination that the batch has not been accepted for fulfillment by a shopper within the threshold amount of time after sending the notification:
      selecting an additional subset of the set of candidate shoppers based on the scores; and
      sending an additional notification to one or more devices associated with the additional subset of candidate shoppers.

2. The method of claim 1, wherein identifying a set of candidate shoppers for fulfilling a batch of one or more orders comprises selecting the set of candidate shoppers based at least in part on being within a threshold distance to the batch.

3. The method of claim 1, wherein the candidate shopper scoring is based on expected resource usage, time to accept (TTA), shopper type, shopper characteristics, or batch characteristics.

4. The method of claim 1, wherein a number of candidate shoppers selected as the subset or additional subset is based in part on characteristics of the batch of one or more orders.

5. The method of claim 1, wherein the steps of determining the batch has not been accepted, selecting additional subset, and sending additional notifications to the additional subset are repeated until the batch is accepted by a shopper for fulfillment.

6. The method of claim 1, wherein the set of candidate shoppers is updated after another threshold amount of time.

7. The method of claim 6, wherein the threshold amount of time is shorter than the other threshold amount of time.

8. The method of claim 6, wherein the set of candidate shoppers is re-scored after the set of candidate shoppers is updated.

9. The method of claim 1, wherein responsive to the determination, the set of candidate shoppers is scored again.

10. A computer program product comprising:
   a non-transitory computer readable storage medium having instructions encoded thereon that, when executed by a processor, cause the processor to:
      identify a set of candidate shoppers for fulfilling a batch of one or more orders;
      score each candidate shopper for fulfilling the batch, wherein the scoring comprises applying a machine learning model that is trained to predict a likelihood that a shopper would accept a batch of one or more orders if offered, wherein training the machine learning model comprises:
         accessing a training dataset comprising a plurality of training items, each training items comprising a batch of orders, features associated with the batch of orders that reflect resource usage to fulfill the batch of order, and an outcome indicating whether a user received the batch of orders accepts the batch of orders;

applying the machine learning model to each training item to predict a likelihood that the user would accept the batch of orders in the respective training example;
updating the training dataset with recent previously delivery orders comprising outcomes of the recent previously delivery orders; and
updating the machine learning model based on the updated training dataset;
select a subset of the set of candidate shoppers based on the scores;
send a notification to one or more devices associated with the subset of the candidate shoppers indicating that the batch is available to be accepted;
determine that the batch has not been accepted for fulfillment by a shopper within a threshold amount of time after sending the notification; and
responsive to the determination that the batch has not been accepted for fulfillment by a shopper within the threshold amount of time after sending the notification:
select an additional subset of the set of candidate shoppers based on the scores; and
send an additional notification to one or more devices associated with the additional subset of candidate shoppers.

11. The computer program product of claim 10, wherein identifying a set of candidate shoppers for fulfilling a batch of one or more orders comprises selecting the set of candidate shoppers based at least in part on being within a threshold distance to the batch.

12. The computer program product of claim 10, wherein the candidate shopper scoring is based on expected resource usage, time to accept (TTA), shopper type, shopper characteristics, or batch characteristics.

13. The computer program product of claim 10 wherein a number of candidate shoppers selected as the subset or additional subset is based in part on characteristics of the batch of one or more orders.

14. The computer program product of claim 10, wherein the steps of determining the batch has not been accepted, selecting additional subset, and sending additional notifications to the additional subset is repeated until the batch is accepted by a shopper for fulfillment.

15. The computer program product of claim 10, wherein the set of candidate shoppers is updated after another threshold amount of time.

16. The computer program product of claim 15, wherein the threshold amount of time is shorter than the other threshold amount of time.

17. The computer program product of claim 15, wherein the set of candidate shoppers is re-scored after the set of candidate shoppers is updated.

18. The computer program product of claim 10, wherein responsive to the determination, the set of candidate shoppers is scored again.

19. A system comprising:
one or more processors; and
a non-transitory computer readable storage medium having instructions encoded thereon that, when executed by the one or more processors, cause the one or more processor to:
identify a set of candidate shoppers for fulfilling a batch of one or more orders;
score each candidate shopper for fulfilling the batch, wherein the scoring comprises applying a machine learning model that is trained to predict a likelihood that a shopper would accept a batch of one or more orders if offered, wherein training the machine learning model comprises:
accessing a training dataset comprising a plurality of training items, each training items comprising a batch of orders, features associated with the batch of orders that reflect resource usage to fulfill the batch of order, and an outcome indicating whether a user received the batch of orders accepts the batch of orders;
applying the machine learning model to each training item to predict a likelihood that the user would accept the batch of orders in the respective training example;
updating the training dataset with recent previously delivery orders comprising outcomes of the recent previously delivery orders; and
updating the machine learning model based on the updated training dataset;
select a subset of the set of candidate shoppers based on the scores;
send a notification to one or more devices associated with the subset of the candidate shoppers indicating that the batch is available to be accepted;
determine that the batch has not been accepted for fulfillment by a shopper within a threshold amount of time after sending the notification; and
responsive to the determination that the batch has not been accepted for fulfillment by a shopper within the threshold amount of time after sending the notification:
select an additional subset of the set of candidate shoppers based on the scores; and
send an additional notification to one or more devices associated with the additional subset of candidate shoppers.

20. The system of claim 19, wherein identifying a set of candidate shoppers for fulfilling a batch of one or more orders comprises selecting the set of candidate shoppers based at least in part on being within a threshold distance to the batch.

* * * * *